United States Patent
Wolfgang et al.

(10) Patent No.: US 6,863,087 B1
(45) Date of Patent: Mar. 8, 2005

(54) FILLING CONNECTION FOR A GAS BOTTLE VALVE

(76) Inventors: Weh Wolfgang, Siemensstrasse 5, 89257 Illertissen (DE); Weh Erwin, Siemensstrasse 5, 89257 Illertissen (DE)

( * ) Notice: Subject to any disclaimer, the term of this patent is extended or adjusted under 35 U.S.C. 154(b) by 0 days.

(21) Appl. No.: 09/445,945

(22) PCT Filed: Jun. 18, 1998

(86) PCT No.: PCT/EP98/03734

§ 371 (c)(1),
(2), (4) Date: Apr. 10, 2000

(87) PCT Pub. No.: WO98/58206

PCT Pub. Date: Dec. 23, 1998

(30) Foreign Application Priority Data

Jun. 18, 1997 (DE) ..................... 297 10 553 U

(51) Int. Cl.[7] ............................................. F16K 11/10
(52) U.S. Cl. ......................................... 137/881; 141/18
(58) Field of Search .............................. 137/881; 141/18

(56) References Cited

U.S. PATENT DOCUMENTS

| | | | |
|---|---|---|---|
| 3,514,074 A | * | 5/1970 | Self ........................ 251/127 |
| 4,586,634 A | | 5/1986 | Minter et al. |
| 4,616,677 A | * | 10/1986 | Krechel et al. ............. 137/881 |
| 4,993,462 A | * | 2/1991 | Oxley et al. ................ 141/346 |
| 5,309,945 A | * | 5/1994 | Sakai et al. ................ 137/861 |
| 5,566,713 A | | 10/1996 | Lhomer et al. |

FOREIGN PATENT DOCUMENTS

| | | |
|---|---|---|
| DE | G 91 15 142 | 3/1992 |
| DE | 43 34 182 | 4/1995 |

* cited by examiner

Primary Examiner—John Fox
(74) Attorney, Agent, or Firm—Knobbe Martens Olson & Bear LLP

(57) ABSTRACT

A filling connection has an actuating element and a discharge connection on the valve body of the gas cylinder valve. In addition to the discharge connection a filling union is provided on the valve body. The filling union extends in its longitudinal direction, and actuating element are arranged opposite the discharge connection and at the side on the valve body. Preferred embodiments include having the discharge connection and the filling union arranged at right angles to one another on the valve body.

6 Claims, 1 Drawing Sheet

FILLING CONNECTION FOR A GAS BOTTLE VALVE

This invention relates to a filling connection for gas cylinder valves according to the pre-characterizing features of claim 1.

Such a filling connection for gas cylinder valves is known from DE-GM 91 15 142. A filling connection is to be made for gas cylinder valves, especially of acetylene cylinders, with which a safe connection can be produced and undone again rapidly and reliably even by non-technical people, since the fitting position of the filling connection has to be carefully controlled with usual filling connections, which can be really complicated and troublesome for lay persons. Accordingly, in this state of the art a clamp-like connector coupling is provided, in which is mounted a cylinder valve connection piston sleeve, biased in the direction of a fitting ring.

After connection to the cylinder valve, the filling passage through the housing or valve body is opened up. However, after connecting the filling coupling on to the connection union, which later serves also as the discharge connection, the gas cylinder valve must additionally be opened by the handwheel normally provided as the actuating element, and must be closed again after the filling. As well as actuating the filling coupling, at least two further manual operations are necessary, which is very time-consuming in series filling.

Accordingly the invention is based on the object of providing a filling connection for gas cylinder valves with which the filling can be speeded up.

This object is met by a filling connection having an actuating element and a discharge connection on the valve body of the gas cylinder valve, wherein in addition to the discharge connection a filling union is provided on the valve body. The filling union extends in its longitudinal direction, and actuating element are arranged opposite the discharge connection and at the side on the valve body. Preferred embodiments include having the discharge connection and the filling union arranged at right angles to one another on the valve body. Preferably the filling union is disposed vertically. Preferably a spring-biased check valve is fitted in the discharge connection and blocks in the filling direction. In a further preferred variation of the above combinations, the discharge connection and the filling union each open into a separate or a common through bore in the valve body. The discharge connection and filling union are preferably formed in one piece with the valve body, and the filling union is preferably fitted in the valve body, especially screwed in. Further, the filling union preferably has an outer annular groove for engagement of a filling coupling. Preferably, the filling union has a company/user specific form for coding, matched to the corresponding filling coupling being used. Moreover, at least one valve, in particular a spring-biased check valve, is preferably fitted in the filling union and blocks in the discharge direction. In the above combinations, the filling union can be coupled to a filling station capable of being automated. Further, the filling station preferably comprises a multiple filling coupling for simultaneous filling of a plurality of gas cylinders. Finally, in the above combinations the filling union preferably has the same outer dimensions and external shape as the discharge connection.

Through the arrangement of a separate, upwardly pointing filling union on the gas cylinder valve, in addition to the discharge connection on the side, a quick connection coupling can be fitted as the filling coupling, while the handwheel of the gas cylinder valve does not have to be opened separately for the filling. A separate gas filling passage is thus created, which is essentially independent of the discharge passage, while both passages can also open into a common through bore, being separated however in terms of flow technology both during the filling operation and also during discharge operation, in particular by check valves connected in opposition to one another.

A substantial advantage here is that the handwheel arranged on the side of the gas cylinder valve does not have to be opened for the filling, nor does it have to be closed again at the end of the filling operation. Two working steps are thus saved, so that the filling of gas cylinders is substantially speeded up. This applies in particular to automated filling by robots, since the upwardly pointing filling union is also optimally accessible in a tightly packed gas cylinder pallet.

Simultaneous filling of a plurality of gas cylinders by means of a multiple filling coupling is also possible through this, e.g. twelve gas cylinders on a pallet at a time, on to which the multiple filling coupling with twelve filling couplings can fitted from above. The filling operation can be substantially speeded up by this.

BRIEF DESCRIPTION OF THE DRAWINGS

An embodiment will be described and explained in more detail below with reference to the drawing.

Figure 1:
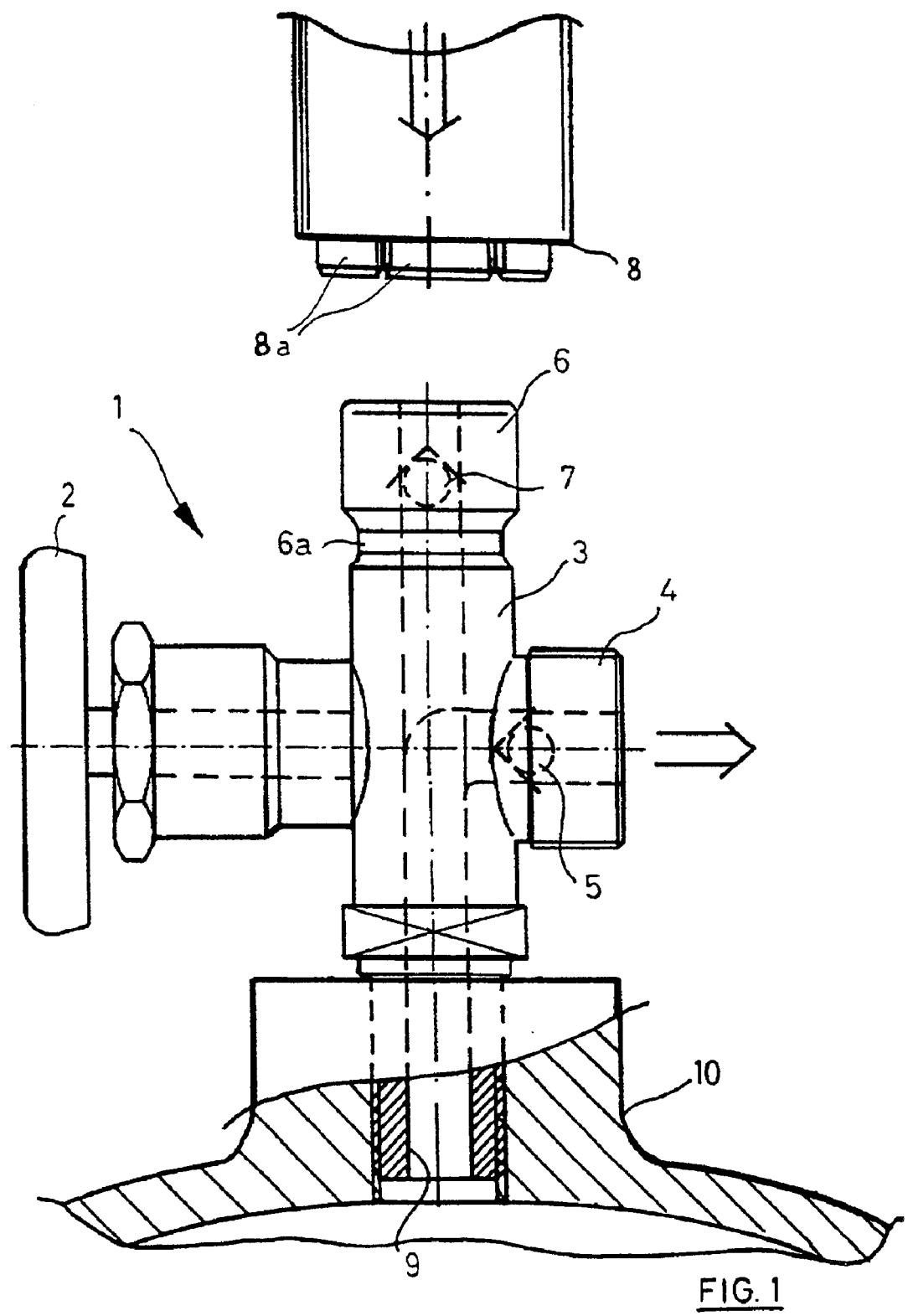
FIG. 1 shows a schematic illustration of a gas cylinder.

A gas cylinder valve 1 is shown schematically in FIG. 1, with a handwheel as actuating element 2 and a valve body 3. The valve body 3 of the gas cylinder valve 1 is attached to a gas cylinder 10 (e.g. for acetylene, oxygen, carbon dioxide, hydrogen or the like) in the usual way, by a screw connection.

A side discharge connection 4 is formed on the valve body 3, preferably in one piece therewith, with a suitable threaded connection corresponding to the standard for the gas in question. A spring-biased check valve 5 is arranged within the discharge connection 4 and only allows gas discharge in the accordance with the arrow shown, being blocked however in the opposite (filling) direction.

In accordance with the invention, a separate filling union 6 is arranged on the valve body 3, preferably at right angles to the discharge connection 4. The filling union 6 can be screwed into the valve body 3 as a separate component or equally, as shown, be formed in one piece with the valve body 3, like the discharge connection 4. An annular groove 6a is formed in the outer wall of the upwardly pointing filling union 6, in which the detent elements 8a of a filling coupling 8 which can be fitted from above can at connected.

The filling coupling 8 is preferably formed as a plug-in coupling with collet jaws according to EP-A 0 340 879 or DE-A 3 518 019, since appropriate safety provisions for filling gas cylinders are provided with these quick connection couplings of the applicant. However a detent ball coupling for an external profile or even if desired an inner engagement profile can optionally be used as the filling coupling 8, as is basically known from hydraulic connectors.

A spring-biased check valve 7 is also arranged in the filling union 6, namely in the bore shown in broken lines within the filling union 6. The filling union 6 also opens into a through bore 9 like the discharge connection 4, which bore communicates with the gas cylinder 10. A valve spool, not shown here, is arranged in the region of the through bore 9 and can be brought into the closed or open position by means of the handwheel 2.

In the open position of the valve spool, the through bore 9 communicates with the discharge connection 4, so that gas can be discharged, while the filling union 6 is de-coupled by the check valve 7. After the gas cylinder 10 has largely been emptied, the gas cylinder valve 1 is closed by means of the handwheel 2 and then taken to the filling operation. However filling can also take place on site, e.g. from a tanker vehicle, where the filling coupling 8 is likewise fitted on to the filling union 6 from above and the gas cylinder 10 in question is filled.

The valve spool 2a stays closed in this filling operation, so that the handwheel 2 no longer has to be operated, in contrast to the known devices; in particular the handwheel 2 does not have to be operated in the opposite direction after completion of the filling operation. Rather it is only necessary for the filling coupling 8 to be taken off. The gas lines attached to the discharge connection 4 can even remain attached when filling on site.

The filling union 6 preferably also has a company and/or user specific form, so that only correspondingly matching filling couplings 8 can be attached. This ensures that only authorised persons can undertake the filling of the gas cylinder 10.

Filling through the discharge connection 4 is also securely avoided through the spring-biased check valve 5 provided in the side discharge connection 4.

In addition it is made possible through this check valve 5 for the gas cylinder to maintain a certain residual pressure, as is required for operation of various installations or is desirable to avoid entry of air into the gas cylinder 10. Time-consuming evacuation of the gas cylinder 10 when refilling is thereby avoided.

DETAILED DESCRIPTION OF THE INVENTION

The filling operation can moreover be largely automated, since the upwardly pointing filling union 6 is readily accessible, in particular both for manual handling devices and robots, with which the: filling coupling 8 can be fitted on from above. A multiple filling station can also be used, in which the individual filling couplings 8 are suspended in that raster in which the gas cylinders 10 are fixed on a pallet.

What is claimed is:

1. A filling connection for gas cylinder valves having an actuating element and a discharge connection on the valve body of the gas cylinder valve, comprising a filling union provided on a valve body in addition to the discharge connection, wherein the discharge connection and filling union are formed in one piece with the valve body, the filling union extending along a longitudinal axis of the filling union and being adapted to be coupled to a filling station capable of being automated, wherein the actuating element is arranged opposite the discharge connection and at a side of the valve body, and wherein the discharge connection and the filling union each open into a separate through bore in the valve body.

2. The filling connection according to claim 1, wherein the discharge connection and the filling union are arranged at right angles to one another on the valve body.

3. The filling connection according to claim 1, wherein a spring-biased check valve is fitted in the discharge connection so as to block gas flow in the filling direction.

4. The filling connection according to claims 1, wherein the filling union has an outer annular groove for engagement of a filling coupling.

5. The filling connection according to claim 1, wherein at least one valve is fitted in the filling union and adapted to block gas flow in the discharge direction.

6. The filling connection according to claim 1, wherein the filling union has the same outer dimensions and external shape as the discharge connection.

\* \* \* \* \*